United States Patent
Zhang et al.

(10) Patent No.: US 11,198,444 B2
(45) Date of Patent: Dec. 14, 2021

(54) AUTOMATED FACTORY TESTFLOW OF PROCESSING UNIT WITH SENSOR INTEGRATION FOR DRIVING PLATFORM

(71) Applicant: Baidu USA LLC, Sunnyvale, CA (US)

(72) Inventors: Tiffany Zhang, Sunnyvale, CA (US); Kwan Oh, Sunnyvale, CA (US); Manjiang Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 167 days.

(21) Appl. No.: 16/510,124

(22) Filed: Jul. 12, 2019

(65) Prior Publication Data

US 2021/0009145 A1    Jan. 14, 2021

(51) Int. Cl.
*B60W 50/04* (2006.01)
*H04N 17/00* (2006.01)
*G07C 5/08* (2006.01)

(52) U.S. Cl.
CPC ......... *B60W 50/045* (2013.01); *G07C 5/0808* (2013.01); *H04N 17/002* (2013.01); *B60W 2050/041* (2013.01)

(58) Field of Classification Search
CPC .......... B60W 50/045; B60W 2050/041; G07C 5/0808; H04N 17/002; G06F 11/2221; G06F 11/2236; G06F 11/263; G06F 11/3013; G06F 11/3093
See application file for complete search history.

(56) References Cited

U.S. PATENT DOCUMENTS

| | | | | |
|---|---|---|---|---|
| 6,236,917 B1 * | 5/2001 | Liebl | ............... | G07C 5/0808 |
| | | | | 701/32.8 |
| 2008/0284575 A1 * | 11/2008 | Breed | ............... | H01H 35/146 |
| | | | | 340/438 |
| 2019/0049958 A1 * | 2/2019 | Liu | ............... | G01S 17/89 |
| 2020/0039524 A1 * | 2/2020 | Chu | ............... | G06F 13/10 |
| 2020/0039533 A1 * | 2/2020 | Bai | ............... | B60W 10/18 |

* cited by examiner

*Primary Examiner* — Brian P Sweeney
(74) *Attorney, Agent, or Firm* — Womble Bond Dickinson (US) LLP (57) ABSTRACT

Diagnosing a sensor processing unit of an autonomous driving vehicle is described. An example computer-implemented method can include transmitting an executable image of a sensor processing application from a host system to the sensor processing unit via at least one of a universal asynchronous receiver-transmitter (UART) or an Ethernet connection. The method also includes causing the sensor processing unit to execute and launch the executable image of the sensor processing application in the DRAM from the eMMC storage device. The method also includes transmitting a sequence of predetermined commands to the executed sensor processing application to perform a plurality of sensor data processing operations on sensor data obtained from a plurality of sensors or sensor simulators associated with an autonomous driving vehicle. The method also includes comparing processing results of the sensor processing operations against expected processing results to determine whether the sensor processing application operates properly.

20 Claims, 8 Drawing Sheets

AUTOMATED FACTORY TESTFLOW OF PROCESSING UNIT WITH SENSOR INTEGRATION FOR DRIVING PLATFORM

TECHNICAL FIELD

Embodiments of the present disclosure relate generally to operating autonomous vehicles. More particularly, embodiments of the disclosure relate to sensor testing.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

The sensors may be connected to a field programmable gate array (FPGA) board via multiple I/O interfaces. Generally, the I/O interfaces need to be tested before the autonomous vehicle leaves the factory and begins driving among the public. Given many sensors are utilized in an autonomous vehicle; it is difficult or inconvenient to automate the testing. There has been a lack of efficient test platforms for testing the sensors of an autonomous vehicle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A field programmable gate array board (FPGA) has several components that are used in association with sensors on an autonomous vehicle. Currently these components are tested individually either before or after installation of the FPGA board into the autonomous vehicle. Usually, an integrated test of the FPGA board and its components does not occur until the FPGA board is installed on the autonomous vehicle. Sensor interfaces and communication data paths are not tested or verified before the FPGA board is installed on the autonomous vehicle. When testing of sensor interfaces and communication data paths do occur, they are tested individually and manually. This is both time-consuming and expensive, especially when a sensor interface or a communication data path fails during testing, because the FPGA board may needs to be removed from the autonomous vehicle and either replaced or fixed.

According to some embodiments, a factory test that covers all or some sensor components and communication interfaces of an FPGA-based computation platform allows for flexible selection of testing and loading of an FPGA image during different stages of development. The factory test may be programmed into a script that runs on host software. The script may include instructions to diagnose a sensor processing unit located on, for example, an FPGA board. The instructions may include steps for testing various 1/O interfaces, such as a joint test action group (JTAG) interface, an Ethernet interface, and so on, as well as other components, such as a dynamic random access memory (DRAM), storage components, or other suitable components. The factory test may be performed automatically, without user input other than inputting instructions to begin the test. The output of the test may be a comparison of processing results of sensor processing operations against expected processing results. This may enable the system to determine whether the sensor processing unit operates properly and may enable the system or a system administrator to take appropriate action.

According to one embodiment, an executable image of a sensor processing application is transmitted from a host system to a sensor processing unit via at least one of a UART interface or an Ethernet connection. The executable image of the sensor processing application is stored in an embedded multimedia controller (eMMC) storage device within the sensor processing unit. The sensor processing unit is to execute and launch the executable image of the sensor processing application in a DRAM of the sensor processing unit from the eMMC within the sensor processing unit. A sequence of predetermined commands are then issued from the host system to the sensor processing unit to perform one or more sensor data processing operations on sensor data obtained from one or more sensors or sensor simulators coupled to the sensor processing unit. The sensors or the simulated sensors are associated with an autonomous driving vehicle. The processing result is the sensor processing operations are compared with the expected and predetermined results to determine whether the sensor processing application operates properly.

In one embodiment, a first signal is transmitted from the host system to the sensor processing unit via a JTAG interface to perform a memory test of the DRAM of the sensor processing unit. The executable image of the sensor processing application is transmitted to the eMMC storage device only in response to determining that the memory test of the DRAM has been performed successfully. In addition, according to one embodiment, a verified executable image of the sensor processing application is transmitted from the host system to the sensor processing unit via the UART or Ethernet interface and stored in a QSPI storage device within the sensor processing unit. The verified sensor processing application is utilized and launched if the regular version of the sensor processing application has been compromised during the normal operations. In one embodiment, the QSPI becomes a read-only storage device once the executable imager of the verified sensor processing application has been stored therein. Further test instructions are transmitted from the host system to the sensor processing unit via various interfaces (e.g., PCIe, I2C, camera interfaces) to test the specific functionalities associated with the corresponding sensors such as cameras, LIDAR, RADAR, etc.

Figure 1A:
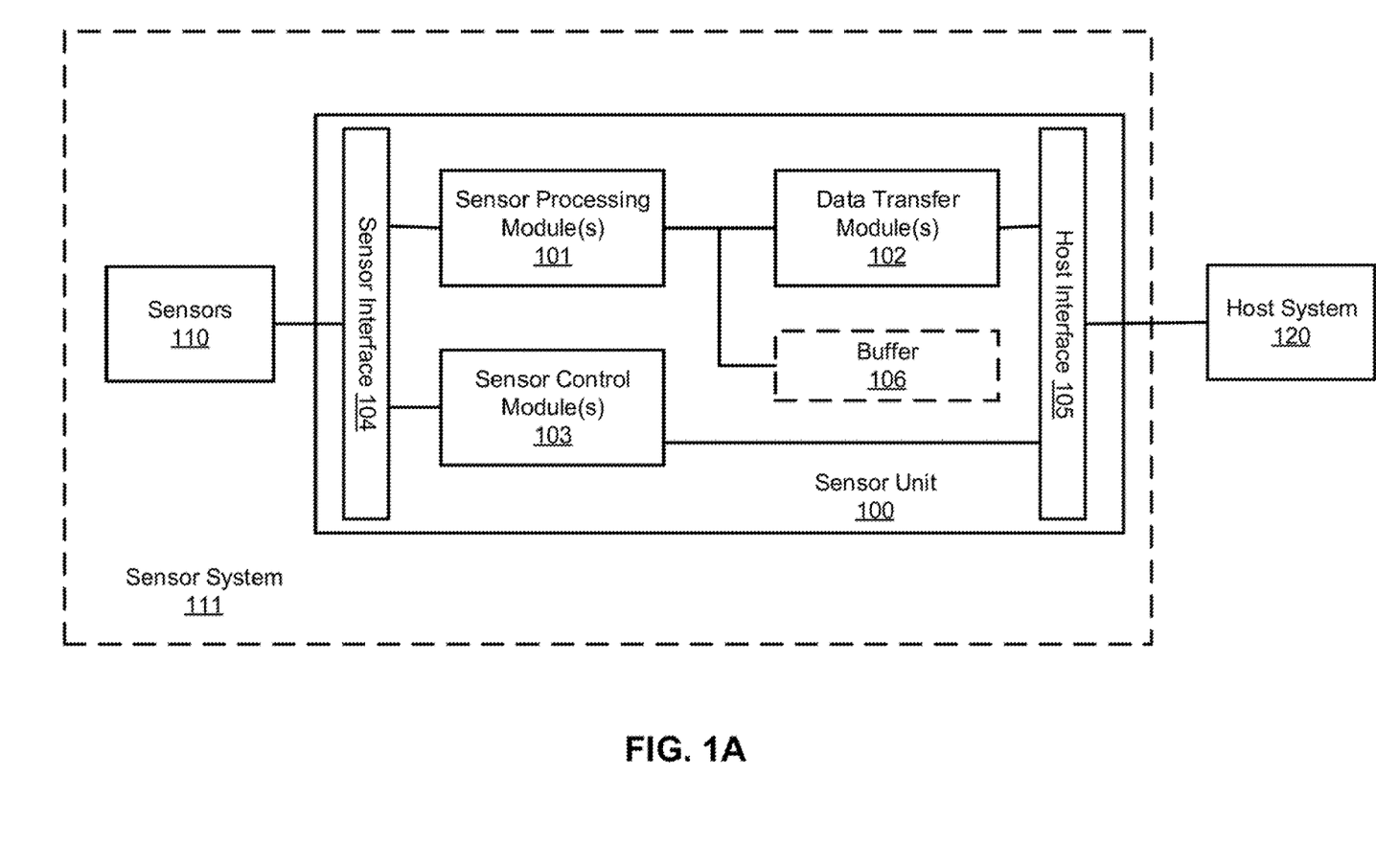
FIGS. 1A and 1B are block diagrams illustrating an example of a sensor unit according to one embodiment.

FIG. 1A is a block diagram illustrating an example of a sensor system according to one embodiment of the invention. Referring to FIG. 1A, sensor system 115 includes a number of sensors 110 and a sensor unit 100 coupled to host system 120. Host system 120 represents a planning and control system. Host system 120 may also execute a testing program that communicate with the sensor unit for the purposes of testing the components of the sensor unit. Sensor unit 100 may be implemented in a form of an FPGA device or an ASIC (application specific integrated circuit) device. In one embodiment, sensor unit 100 includes, amongst others, one or more sensor data processing modules 101 (also simply referred to as sensor processing modules), data transfer modules 102, and sensor control modules or logic 103. Modules 101-103 can communicate with sensors 110 via a sensor interface 104 and communicate with host system 120 via host interface 105. Optionally, an internal or external buffer 106 may be utilized for buffering the data for processing.

In one embodiment, for the receiving path or upstream direction, sensor processing module 101 is configured to receive sensor data from a sensor via sensor interface 104 and process the sensor data (e.g., format conversion, error checking), which may be temporarily stored in buffer 106. Data transfer module 102 is configured to transfer the processed data to host system 120 using a communication protocol compatible with host interface 105. Similarly, for the transmitting path or downstream direction, data transfer module 102 is configured to receive data or commands from host system 120. The data is then processed by sensor processing module 101 to a format that is compatible with the corresponding sensor. The processed data is then transmitted to the sensor.

In one embodiment, sensor control module or logic 103 is configured to control certain operations of sensors 110, such as, for example, timing of activation of capturing sensor data, in response to commands received from host system (e.g., perception module 302) via host interface 105. Host system 120 can configure sensors 110 to capture sensor data in a collaborative and/or synchronized manner, such that the sensor data can be utilized to perceive a driving environment surrounding the vehicle at any point in time.

Sensor interface 104 can include one or more of Ethernet, USB (universal serial bus), LTE (long term evolution) or cellular, Wi-Fi, GPS, camera, CAN, serial (e.g., universal asynchronous receiver transmitter or UART), SIM (subscriber identification module) card, and other general purpose input/output (GPIO) interfaces. Host interface 105 may be any high speed or high bandwidth interface such as PCIe (peripheral component interconnect or PCI express) interface. Sensors 110 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 100. The serial interface such as UART can be coupled with a console system for debug purposes.

Note that sensors 110 can be any kind of sensors and provided by various vendors or suppliers. Sensor processing module 101 is configured to handle different types of sensors and their respective data formats and communication protocols. According to one embodiment, each of sensors 110 is associated with a specific channel for processing sensor data and transferring the processed sensor data between host system 120 and the corresponding sensor. Each channel includes a specific sensor processing module and a specific data transfer module that have been configured or programmed to handle the corresponding sensor data and protocol, as shown in FIG. 1B.

Figure 1B:
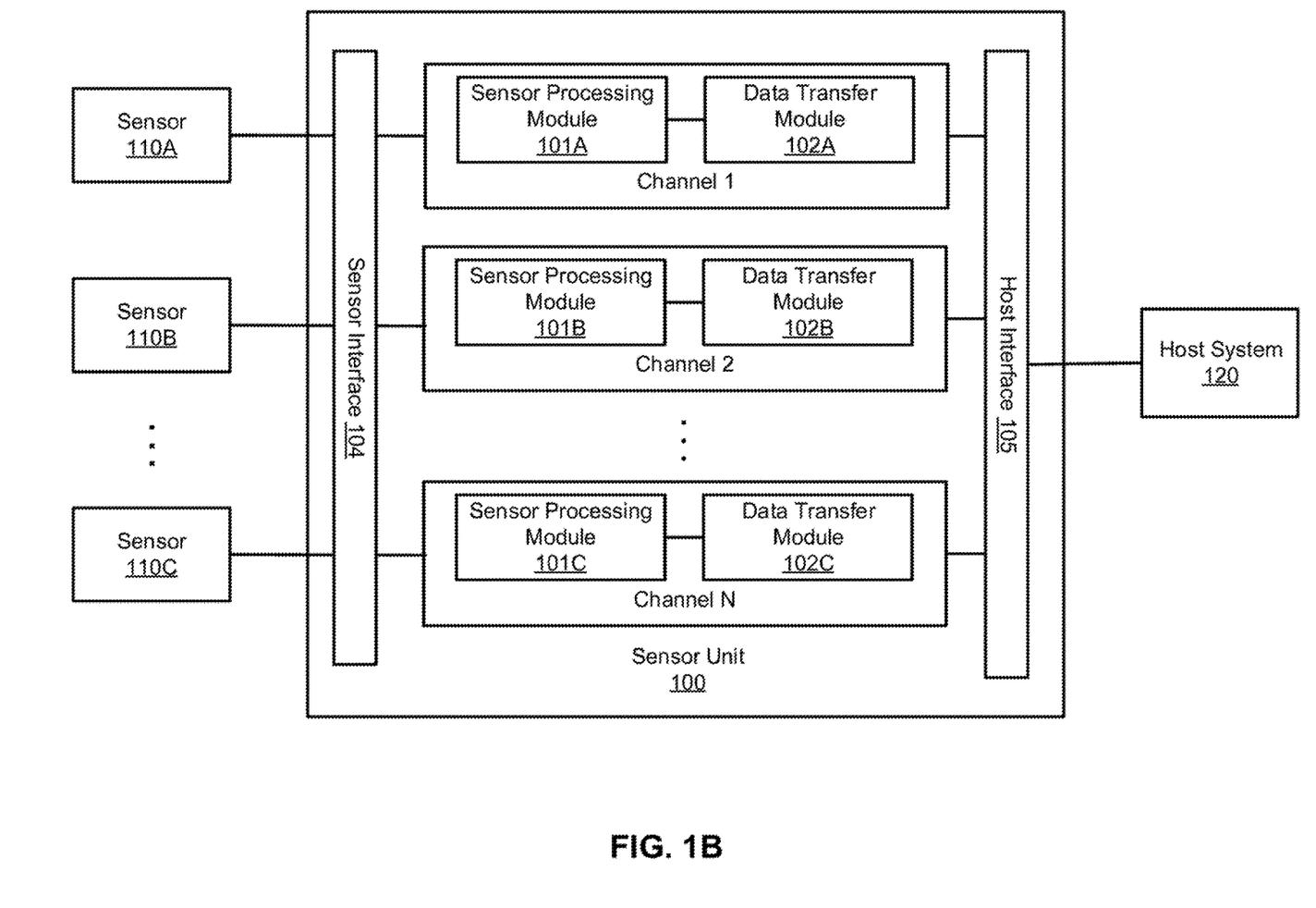

Referring now to FIG. 1B, sensor processing modules 101A-101C are specifically configured to process sensor data obtained from sensors 110A-110C respectively. Note that sensors 110A-110C may the same or different types of sensors. Sensor processing modules 101A-101C can be configured (e.g., software configurable) to handle different sensor processes for different types of sensors. For example, if sensor 110A is a camera, processing module 101A can be figured to handle pixel processing operations on the specific pixel data representing an image captured by camera 110A. Similarly, if sensor 110A is a LIDAR device, processing module 101A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 102A-102C can be configured to operate in different modes, as different kinds of sensor data may be in different size or sensitivities that require different speed or timing requirement. According to one embodiment, each of data transfer modules 102A-102C can be configured to operate in one of a low latency mode, a high bandwidth mode, and a memory mode (also referred to as a fixed memory mode).

When operating in a low latency mode, according to one embodiment, a data transfer module (e.g., data transfer module 102) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 102) is configured to accumulate the sensor data received from a sensor up to a predetermined amount, but is still within the bandwidth the connection between the data transfer module and the host system 120. The accumulated sensor data is then transferred to the host system 120 in a batch that maximum the bandwidth of the connection between the data transfer module and host system 120. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 120, similar to a shared memory page. Examples of the sensor data to be transferred using memory mode include system status data such as temperature, fans speed, etc.

Figure 2:
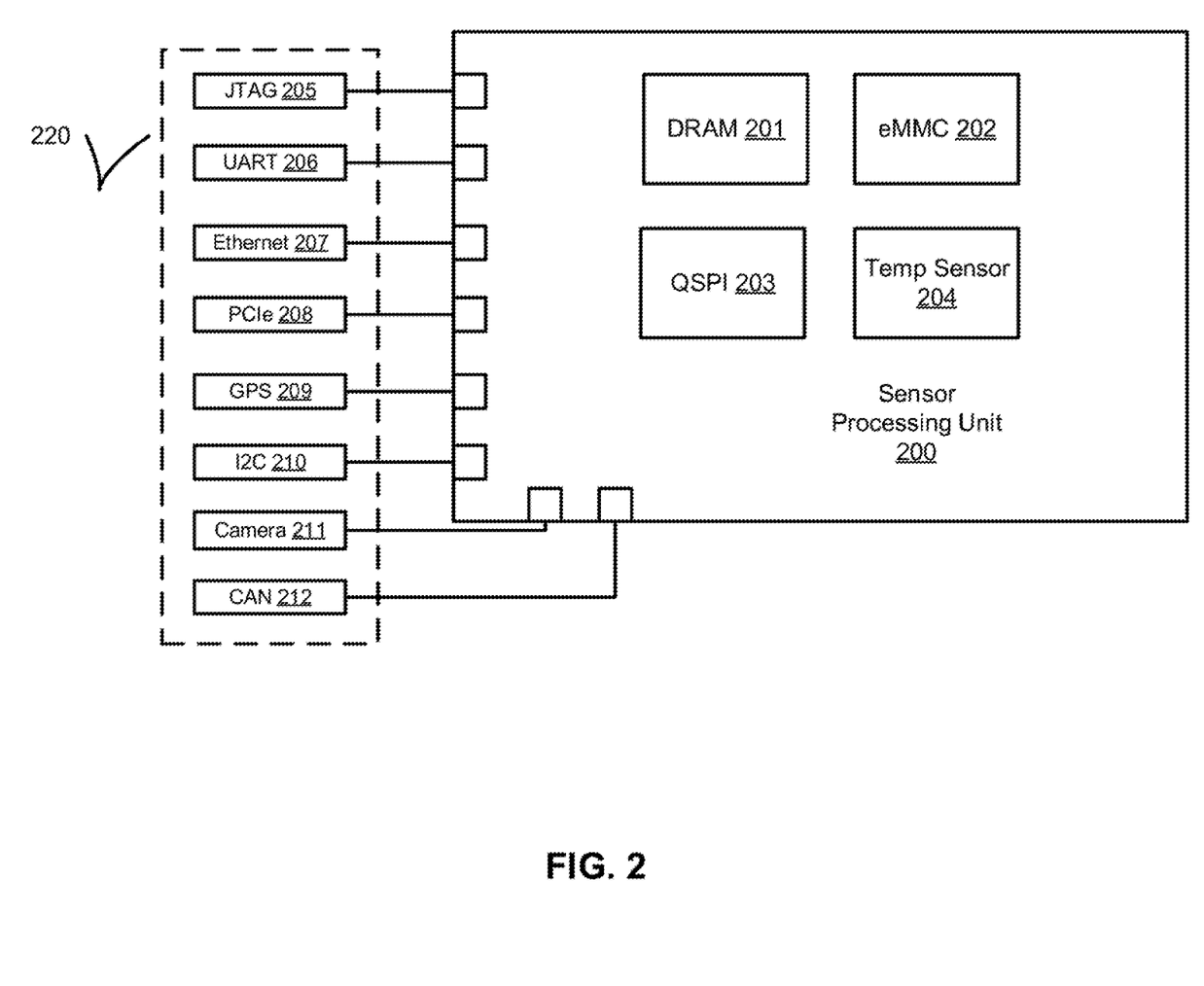
FIG. 2 is an example block diagram of a field programmable gate array (FPGA) board according to one embodiment of the invention.

FIG. 2 is an example block diagram of a sensor processing unit 200 according to one embodiment of the invention. Sensor processing unit may be or include, for example a field programmable gate array (FPGA) board. Sensor processing unit 200 may include multiple 10 interfaces 220. I/O interfaces 220 may include a joint test action group (JTAG) 205 interface, a Universal Asynchronous Receiver/Transmitter (UART) 206 interface, an Ethernet 207 interface, a Peripheral Component Interconnect Express (PCIe) 208 interface, a GPS 209 interface, an inter-integrated circuit (I2C) 210 interface, a camera 211 interface, and a controller area network (CAN) 212 interface. In embodiments, the JTAG 205 interface may be an industry standard test for verifying hardware designs and testing the FPGA after manufacture. In embodiments, the UART 206 interface may be a computer hardware device for asynchronous serial communication in which the data format and transmission speeds are configurable. In embodiments, the Ethernet 207 interface may be an Ethernet connection as is known in the art. In embodiments, the PCIe 208 interface may be an interface standard for connecting high-speed components, as may be known in the art of FPGA boards. In embodiments, the GPS 209 interface may be a global positioning system interface as is known in the art. In embodiments, the I2C 210 interface may be used for communication between a master (or multiple masters) and a single or multiple slave devices. In embodiments, the camera 211 interface may connect a camera sensor (e.g., video) to the FPGA board according to any suitable method. In embodiments, the CAN 212 interface may connect the CAN bus to the FPGA board.

In addition to the I/O interfaces 220, sensor processing unit 200 may include one or more on-board components, including dynamic random access memory (DRAM) 201, embedded MMC (eMMC) 202, queued serial peripheral interface (QSPI) 203, and temperature (temp) sensor 204. DRAM 201 may be is a type of random access memory used to store and access larger sets of data than block RAM (BRAM) or look-up tables (LUTs). In embodiments, the eMMC 202 architecture may place the MMC components (flash memory plus controller) into a small ball grid army (BGA) IC package for use in circuit boards as an embedded non-volatile memory system. In embodiments, QPSI may be a type of SPI controller that uses a data queue to transfer data across the SPI bus. It may have a wrap-around mode allowing continuous transfers to and from the queue with only intermittent attention from the CPU. The Serial Peripheral Interface (SPI) may be a synchronous serial communication interface specification used for short-distance communication, primarily in embedded systems.

Figure 3:
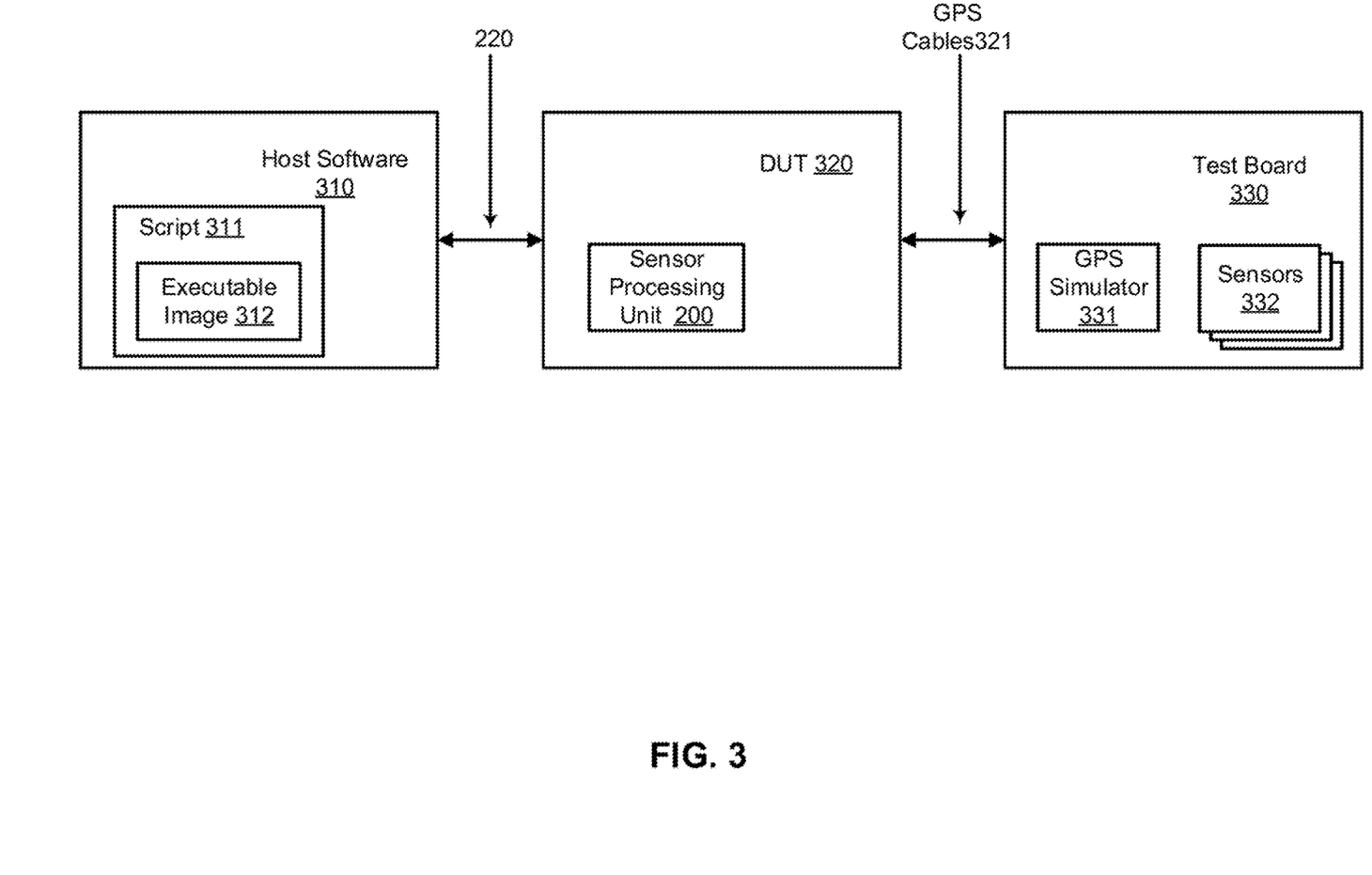
FIG. 3 is an example block diagram of a FPGA under test in connection with host software and a test board according to one embodiment.

FIG. 3 is an example block diagram of a sensor processing unit 200 under test in connection with host software and a test board according to one embodiment. The sensor processing unit 200 may be located on a device under test (DUT) 320 that is connected to host software 310 via the I/O connections 220. The DUT 320 may also be connected to a test board 330, which may include a GPS simulator 331 and one or more sensors 332. Sensors 332 may be actual sensors or may be sensor simulators which may simulate various visual, electrical, or other suitable sensors. In embodiments, test board 330 may also include any other appropriate components such as LED lights or any other suitable I/O device.

In embodiments, host software 310 may include a script 311 that includes the steps performed in the automatic factory test. The automatic factory test may be initiated by transmitting an executable image 312 of a sensor processing application from a host system to a sensor processing unit 200. The executable image 312 may include the particular diagnostic instructions to be performed on the sensor processing unit. The executable image 312 may be customized for each sensor processing unit or may be the same image for multiple sensor processing units. The sensor processing application may be applied to the sensor processing unit and may imitate the type of sensing data that would be received in the field. The host system may be a manufacturer of the autonomous vehicle that will be using the sensor processing unit, or may be a third-party tester of the sensor processing unit. In particular embodiments, the executable image 312 may be sent to the sensor processing unit via the UART 206 interface or the Ethernet 207 interface. As an example and not by way of limitation, with reference to FIG. 3, host software 310 may include script 311, which includes the executable image 312. The executable image 312 may be transmitted to the DUT 320 and FPGA 200 via the I/O interfaces 220, specifically the UART 206 interface or the Ethernet 207 interface. In particular embodiments, the executable image 312, after it is transmitted to the sensor processing unit 200, the executable image 312 may be stored in the eMMC 202, which may be a storage device within the sensor processing unit 200.

In particular embodiments, the sensor processing unit may execute and launch the executable image 312 in the DRAM 201 from the eMMC 202 storage device. This may cause the sensor processing unit 200 to perform one or more indicated tasks according to instructions encoded on the executable image 312. The instructions may be included in the script 311. The script 311 and/or instructions may be any suitable type of instructions, including machine code instructions, bytecode, or script language instructions.

In particular embodiments, the sensor processing unit 200 may transmit a sequence of predetermined commands to the executed sensor processing application to perform a plurality of sensor data processing operations on sensor data obtained from a plurality of sensors or sensor simulators associated with an autonomous driving vehicle.

In particular embodiments, the sensor processing unit 200 may compare processing results of the sensor processing operations against expected processing results to determine whether the sensor processing application operates properly. The comparison may be made by using any suitable means for determining how different two groups of data are, including making a linear determination using a simple subtraction formula, and if the difference between the results of the sensor processing operations and the expected processing results is greater than a threshold value, it may be determined that the sensor processing application does not operate properly.

In particular embodiments, an executable image of a verified sensor processing application may be transferred from the host system to the sensor processing device 200 via at least one of the UART 206 or Ethernet 207 connection. The executable image of the verified sensor processing application may be stored in a quad serial peripheral interface (QSPI) 203 storage device within the sensor processing unit. The executable image of the verified sensor processing application may be referred to as a "golden image" that is to be used as a backup image in the event that the original executable image is corrupted or compromised in any way. Thus, in particular embodiments, the verified sensor processing application may be launched and executed in the DRAM 201 in response to determining that the executable image of the sensor processing application has been compromised. The executable image of the sensor processing application may be compromised by any means, such as a virus, damage to the hardware, a corrupt or incomplete software or firmware update, or any other means. In particular embodiments, the QSPI 203 storage device may become a read-only storage device when the executable image of the verified sensor processing application has been stored therein. This may be to prevent anyone from writing to QSPI 203 storage and tampering with the executable image of the verified sensor processing application.

In particular embodiments, the script 311 may further include instructions to perform one or more tests on the sensor processing unit 200 or various components within sensor processing unit 200. For example, the script 311 may include instructions for transmitting a first signal from the host system to the sensor processing unit via the JTAG 205 interface to perform a memory test on a DRAM 201 contained within the sensor processing unit 200. In embodiments, the executable image 312 of the sensor processing application is transmitted to the eMMC 202 storage device only in response to determining that the memory test of the DRAM 201 has been performed successfully. A successful performance of the memory test of the DRAM 201 may indicate that the DRAM 201 functions properly.

In particular embodiments, another test included in the instructions of script 311 may be to perform a to perform a peripheral component interconnect express (PCIe) test to determine that a PCIe interface on the sensor processing unit 200 is functional. The instructions may also include outputting a result of the PCIe test for display. Another test included in the instructions may be an integer-integrated circuit (I2C) test to determine that an I2C interface on the sensor processing unit 200 is functional. The instructions may also include outputting a result of the I2C test for display. Another test included in the instructions may be a camera test to determine that a camera interface on the sensor processing unit 200 is functional. The instructions may also include outputting a result of the camera test for display.

Another test included in the instructions may be a GPS test to determine that a GPS 209 interface on the sensor processing unit 200 is functional. The instructions may also include outputting a result of the GPS test for display. Other tests may be included as well, including any test that helps the system determine whether any component of the sensor processing unit 200 or its I/O interfaces 220 are functioning properly, including temperature sensor 204, CAN 212, which may be the CAN bus interface, or any other suitable component. This series of tests may help save time by automatically testing various components of the sensor processing unit 200 before it is mounted and installed in an autonomous vehicle. If problems are detected with the sensor processing unit 200, it may be repaired or replaced before it is installed on the autonomous vehicle.

Figure 4:
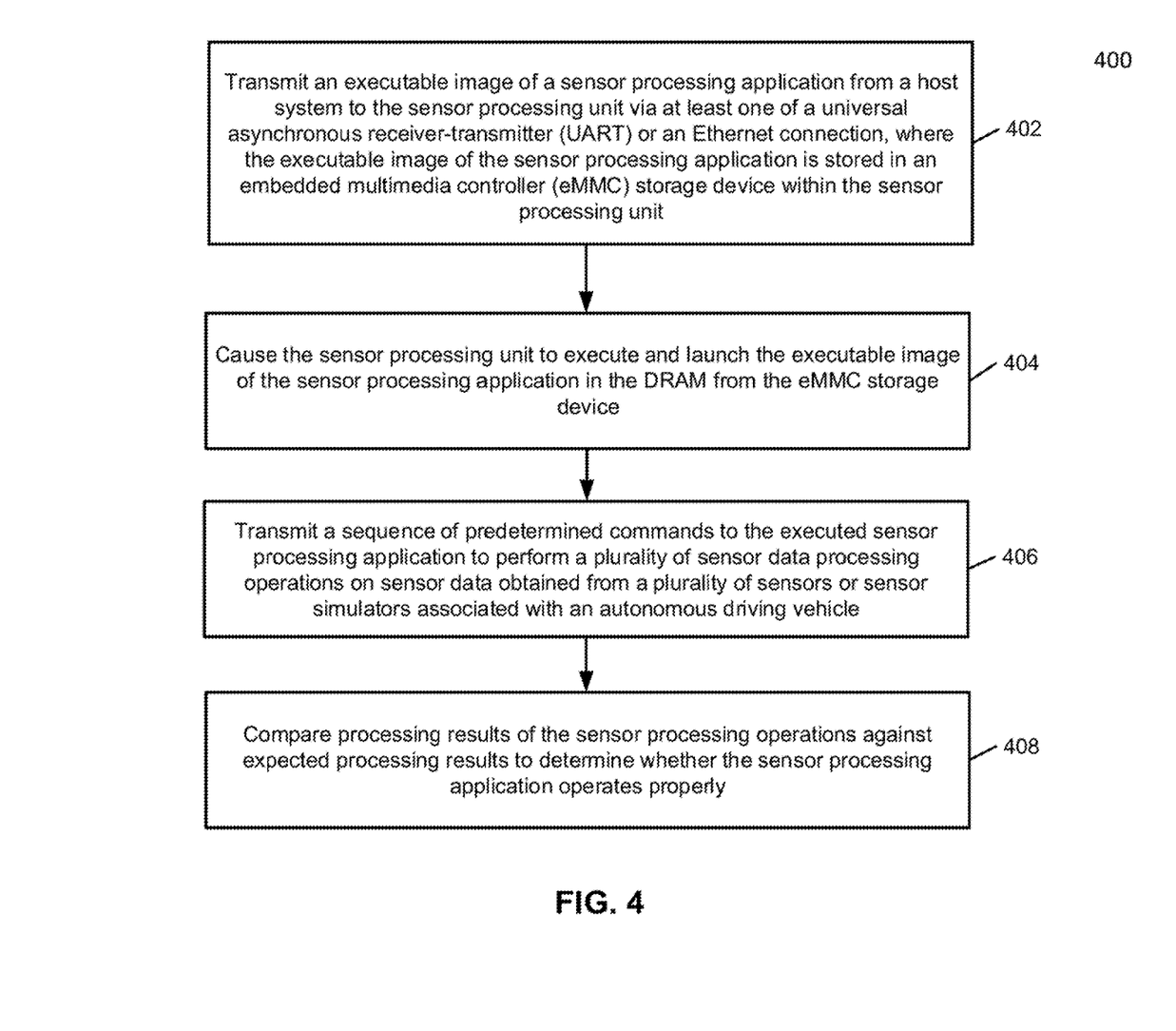
FIG. 4 is an example method for diagnosing a sensor processing unit of an autonomous driving vehicle according to one embodiment.

FIG. 4 is an example method for diagnosing a sensor processing unit of an autonomous driving vehicle according to one embodiment. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. At block 410, the processing logic may transmit an executable image 312 of a sensor processing application from host software 310 of a host system to a sensor processing unit 200. The executable image may be transmitted via a UART 206 interface or an Ethernet 207 interface, or both. The executable image 312 of the sensor processing application may be stored in an eMMC 202 storage device within the sensor processing unit. At block 404, the processing logic may cause the sensor processing unit 200 to execute and launch the executable image 312 of the sensor processing application in the DRAM 201 of the sensor processing unit 200. At block 406, the processing logic may transmit a sequence of predetermined commands to the executed sensor processing application to perform multiple sensor data processing operations on sensor data obtained from multiple sensors or sensor simulators associated with an autonomous driving vehicle. At block 408, the processing logic may compare processing results of the sensor processing operations against expected processing results to determine whether the sensor processing application operates properly.

Particular embodiments may repeat one or more operations of method 400 of FIG. 4, where appropriate. Although this disclosure describes and illustrates particular operations of the method of FIG. 4 as occurring in a particular order, this disclosure contemplates any suitable operations of the method of FIG. 4 occurring in any suitable order. Moreover, although this disclosure describes and illustrates an example method for diagnosing a sensor processing unit of an autonomous driving vehicle, including the particular operations of the method of FIG. 4, this disclosure contemplates any suitable method for diagnosing a sensor processing unit of an autonomous driving vehicle including any suitable steps, which may include all, some, or none of the operations of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable operations of the method of FIG. 4.

Figure 5:
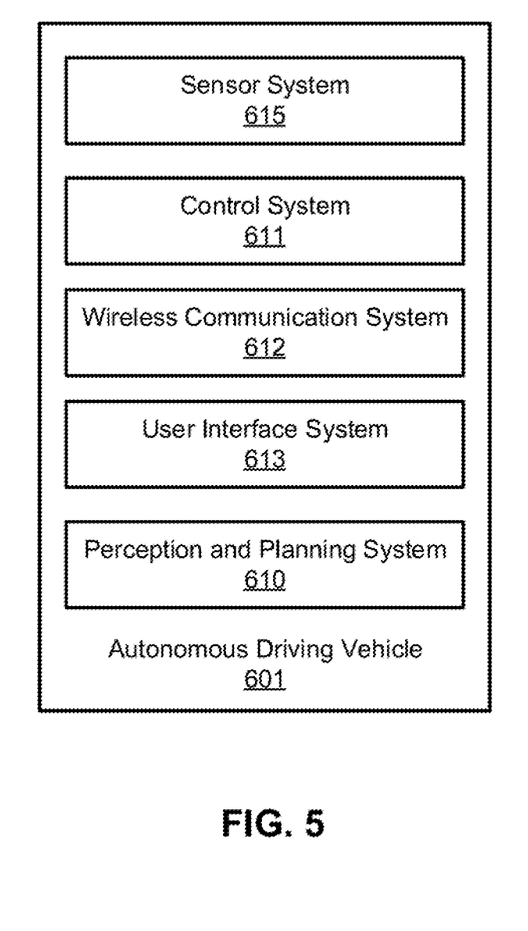
FIG. 5 is a block diagram illustrating an autonomous driving vehicle according to one embodiment.

FIG. 5 is a block diagram illustrating an autonomous driving vehicle according to one embodiment of the disclosure. Referring to FIG. 5, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, perception and planning system 610, vehicle control system 611, wireless communication system 612, user interface system 613, infotainment system 114, and sensor system 615. Sensor system 615 may include sensors 711-715 representing at least some of the sensors 110 as shown in FIGS. 1A and 1B. Perception and planning system 610 may represent host system 120 of FIGS. 1A and 1B. Autonomous driving vehicle 601 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 6:
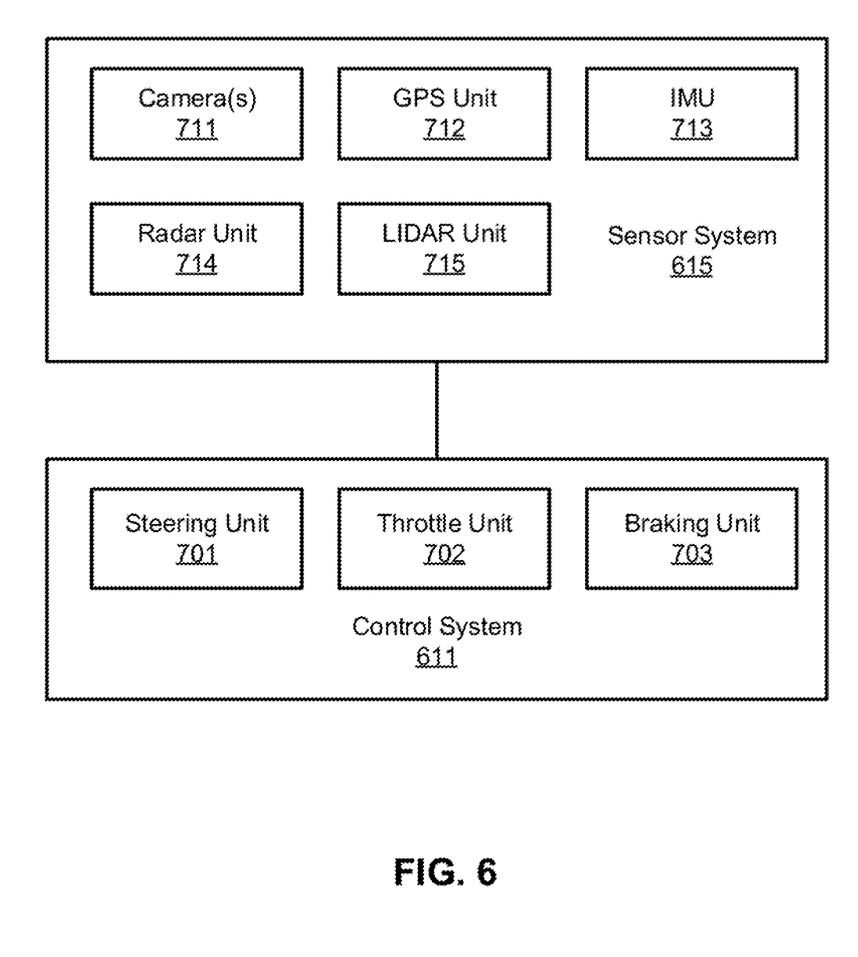
FIG. 6 is a block diagram illustrating an example of an autonomous driving vehicle according to one embodiment.

Referring now to FIG. 6, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 6 may be implemented in hardware, software, or a combination thereof.

Referring back to FIG. 5, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using Wi-Fi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601 is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 7:
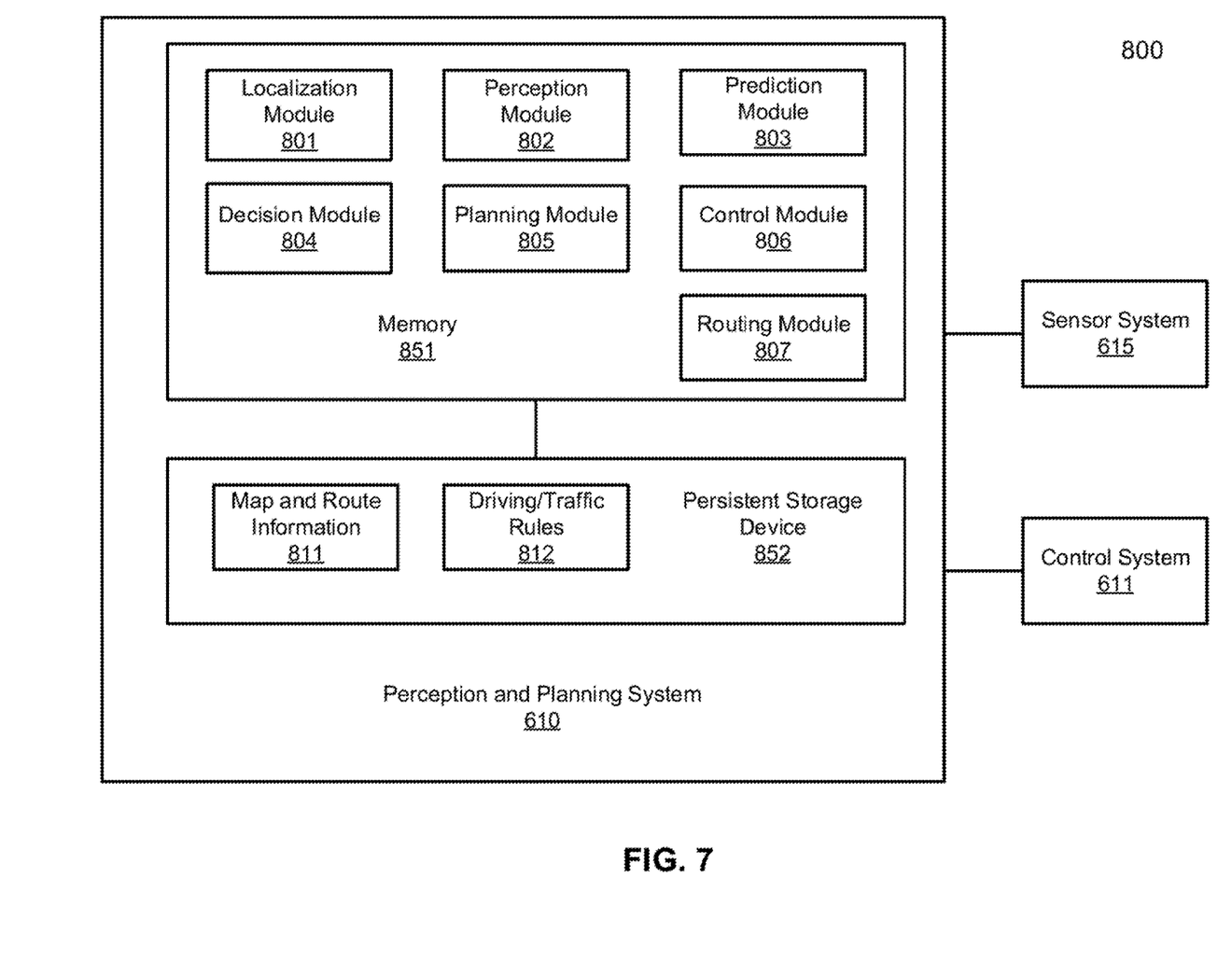
FIG. 7 is a block diagram illustrating an example of a perception and planning system used with an autonomous driving vehicle according to one embodiment.

FIG. 7 is a block diagram illustrating an example of a perception and planning system used with an autonomous driving vehicle according to one embodiment. System 800 may be implemented as a part of autonomous driving vehicle 601 of FIG. 5 including, but is not limited to, perception and planning system 610, control system 611, and sensor system 615. Referring to FIG. 7, perception and planning system 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 6. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if them is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 613. The PNC layer may include functionalities of at least planning module 805 and control module 806. The perception layer may include functionalities of at least perception module 802. In one embodiment, there is an additional layer including the functionalities of prediction module 803 and/or decision module 804. Alternatively, such functionalities may be included in the PNC layer and/or the perception layer. The firmware layer may represent at least the functionality of sensor system 615, which may be implemented in a form of a field programmable gate array (FPGA). The hardware layer may represent the hardware of the autonomous driving vehicle such as control system 611. The application layer, PNC layer, and perception layer can communicate with the firmware layer and hardware layer via the device driver layer.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for diagnosing a sensor processing unit of an autonomous driving vehicle, the method comprising:
   transmitting, by a host system, an executable image of a sensor processing application to the sensor processing unit via at least one of a universal asynchronous receiver-transmitter (UART) or an Ethernet connection, wherein the sensor processing unit comprises an embedded multimedia controller (eMMC) storage device and a dynamic random-access memory (DRAM), wherein the executable image of the sensor processing application is stored in the eMMC storage device within the sensor processing unit;
   causing, by the host system, the sensor processing unit to execute and launch the executable image of the sensor processing application in a the (DRAM) within the sensor processing unit from the eMMC storage device;
   transmitting, by the host system, a sequence of predetermined commands to the executed sensor processing application to perform a plurality of sensor data processing operations on sensor data obtained from a plurality of sensors or sensor simulators associated with the autonomous driving vehicle; and
   comparing, by the host system, processing results of the sensor processing operations against expected processing results to determine whether the sensor processing application operates properly.

2. The method of claim 1, further comprising transmitting a first signal from the host system to the sensor processing unit via a joint test action group (JTAG) interface to perform a memory test on the DRAM, wherein the executable image of the sensor processing application is transmitted to the eMMC storage device only in response to determining that the memory test of the DRAM has been performed successfully.

3. The method of claim 1, further comprising transmitting from the host system an executable image of a verified sensor processing application via at least one of the UART or Ethernet connection, wherein the executable image of the verified sensor processing application is stored in a quad serial peripheral interface (QSPI) storage device within the sensor processing unit.

4. The method of claim 3, wherein the verified sensor processing application is launched and executed in the DRAM in response to determining that the executable image of the sensor processing application has been compromised.

5. The method of claim 3, wherein the QSPI storage device becomes a read-only storage device once the executable image of the verified sensor processing application has been stored therein.

6. The method of claim 1, further comprising:
   transmitting from the host system to the sensor processing unit one or more instructions to perform a peripheral component interconnect express (PCIe) test to determine that a PCIe interface on a sensor-interface board containing the sensor processing unit is functional; and
   outputting a result of the PCIe test for display.

7. The method of claim 1, further comprising:
   transmitting from the host system to the sensor processing unit one or more instructions to perform an integer-integrated circuit (I2C) test to determine that an I2C interface on a sensor-interface board is functional; and
   outputting a result of the I2C test for display.

8. The method of claim 1, further comprising:
   transmitting from the host system to the sensor processing unit one or more instructions to perform a camera test to determine that a camera interface on a sensor-interface board is functional; and
   outputting a result of the camera test for display.

9. A system for diagnosing a sensor processing unit of an autonomous driving vehicle, the system comprising one or more computer processing devices of a host system programmed to:
   transmit an executable image of a sensor processing application from the host system to the sensor processing unit via at least one of a universal asynchronous receiver-transmitter (UART) or an Ethernet connection, wherein the sensor processing unit comprises an embedded multimedia controller (eMMC) storage device and a dynamic random-access memory (DRAM), wherein the executable image of the sensor processing application is stored in the eMMC storage device within the sensor processing unit;
   cause the sensor processing unit to execute and launch the executable image of the sensor processing application in a the DRAM) within the sensor processing unit from the eMMC storage device;
   transmit a sequence of predetermined commands to the executed sensor processing application to perform a plurality of sensor data processing operations on sensor data obtained from a plurality of sensors or sensor simulators associated with the autonomous driving vehicle; and
   compare processing results of the sensor processing operations against expected processing results to determine whether the sensor processing application operates properly.

10. The system of claim 9, wherein the computer processing devices are further programmed to transmit a first signal from the host system to the sensor processing unit via a joint test action group (JTAG) interface to perform a memory test on the DRAM, wherein the executable image of the sensor processing application is transmitted to the eMMC storage device only in response to determining that the memory test of the DRAM has been performed successfully.

11. The system of claim 9, wherein the computer processing devices are further programmed to transmit from the host system an executable image of a verified sensor processing application via at least one of the UART or Ethernet connection, wherein the executable image of the verified sensor processing application is stored in a quad serial peripheral interface (QSPI) storage device within the sensor processing unit.

12. The system of claim 11, wherein the verified sensor processing application is launched and executed in the DRAM in response to determining that the executable image of the sensor processing application has been compromised.

13. The system of claim 11, wherein the QSPI storage device becomes a read-only storage device once the executable image of the verified sensor processing application has been stored therein.

14. The system of claim 9, wherein the computer processing devices are further programmed to:
    transmit from the host system to the sensor processing unit one or more instructions to perform a peripheral component interconnect express (PCIe) test to determine that a PCIe interface on a sensor-interface board containing the sensor processing unit is functional; and
    output a result of the PCIe test for display.

15. The system of claim 9, wherein the computer processing devices are further programmed to:
    transmit from the host system to the sensor processing unit one or more instructions to perform an integer-integrated circuit (I2C) test to determine that an I2C interface on a sensor-interface board is functional; and
    output a result of the I2C test for display.

16. A non-transitory computer-readable medium having instructions stored thereon that, when executed by one or more computer processing devices of a host system, cause the one or more computer processing devices to:
    transmit an executable image of a sensor processing application from the host system to the sensor processing unit via at least one of a universal asynchronous receiver-transmitter (UART) or an Ethernet connection, wherein the sensor processing unit comprises an embedded multimedia controller (eMMC) storage device and a dynamic random-access memory (DRAM), wherein the executable image of the sensor processing application is stored in the eMMC storage device within the sensor processing unit;
    cause the sensor processing unit to execute and launch the executable image of the sensor processing application in the DRAM within the sensor processing unit from the eMMC storage device;
    transmit a sequence of predetermined commands to the executed sensor processing application to perform a plurality of sensor data processing operations on sensor data obtained from a plurality of sensors or sensor simulators associated with the autonomous driving vehicle; and
    compare processing results of the sensor processing operations against expected processing results to determine whether the sensor processing application operates properly.

17. The non-transitory computer-readable medium of claim 16, wherein the instructions further cause the one or more computer processing devices to transmit a first signal from the host system to the sensor processing unit via a joint test action group (JTAG) interface to perform a memory test on the DRAM, wherein the executable image of the sensor processing application is transmitted to the eMMC storage device only in response to determining that the memory test of the DRAM has been performed successfully.

18. The non-transitory computer-readable medium of claim 16, wherein the instructions further cause the one or more computer processing devices to transmit from the host system an executable image of a verified sensor processing application via at least one of the UART or Ethernet connection, wherein the executable image of the verified sensor processing application is stored in a quad serial peripheral interface (QSPI) storage device within the sensor processing unit.

19. The non-transitory computer-readable medium of claim 18, wherein the verified sensor processing application is launched and executed in the DRAM in response to determining that the executable image of the sensor processing application has been compromised.

20. The non-transitory computer-readable medium of claim 18, wherein the QSPI storage device becomes a read-only storage device once the executable image of the verified sensor processing application has been stored therein.

* * * * *